April 13, 1948. E. G. GRUBBS 2,439,540
ROTARY VALVE FOR INTERNAL-COMBUSTION ENGINES
Filed May 2, 1944 4 Sheets-Sheet 4
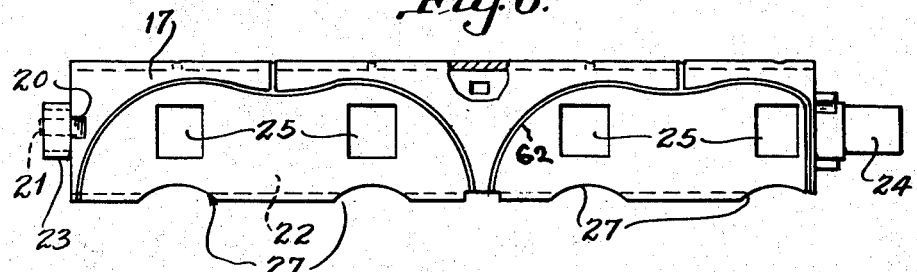
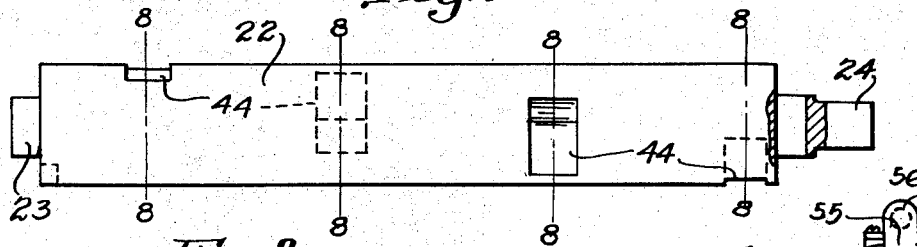
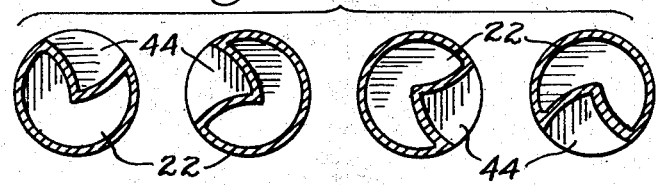
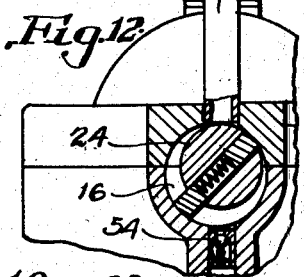
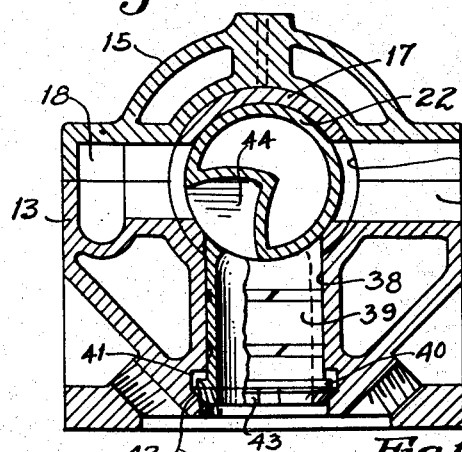
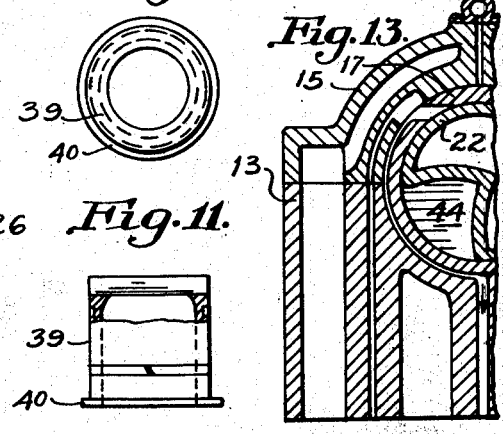
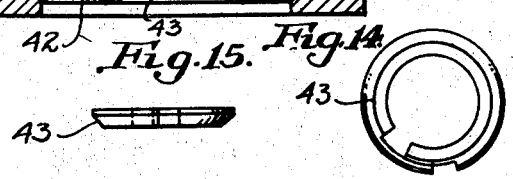
INVENTOR.
Edward G. Grubbs
BY W. E. Williams
ATTORNEY.

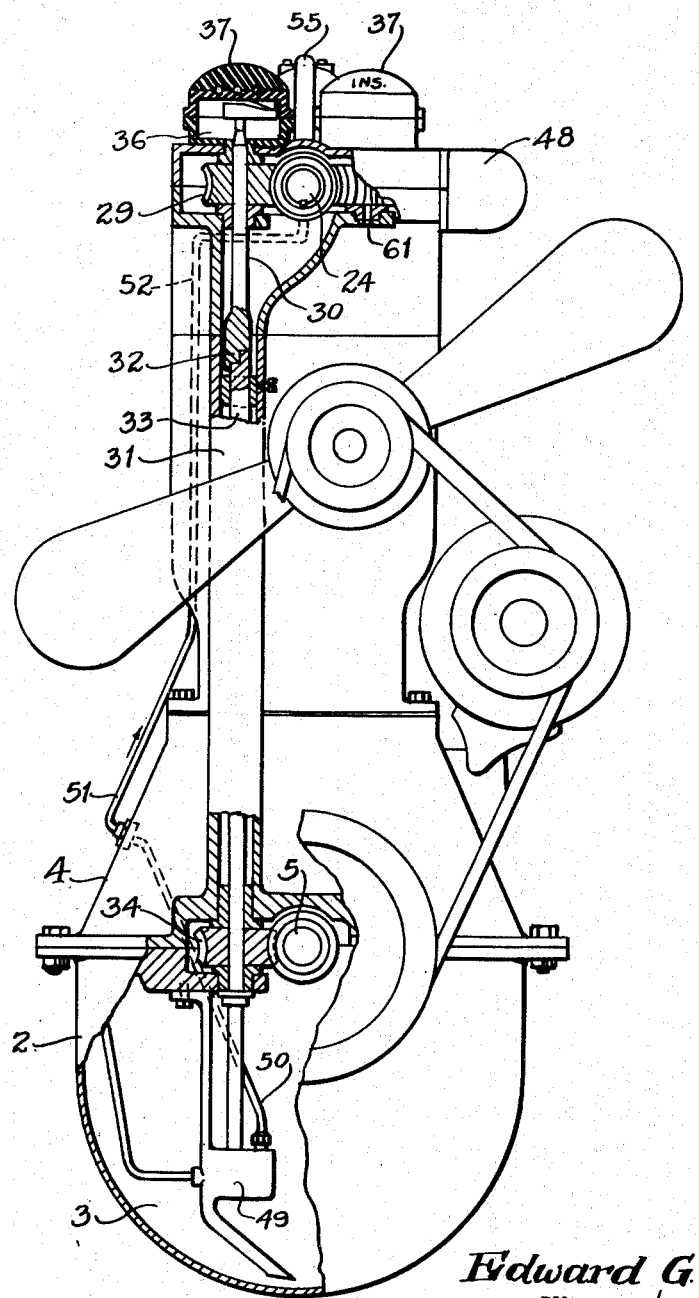

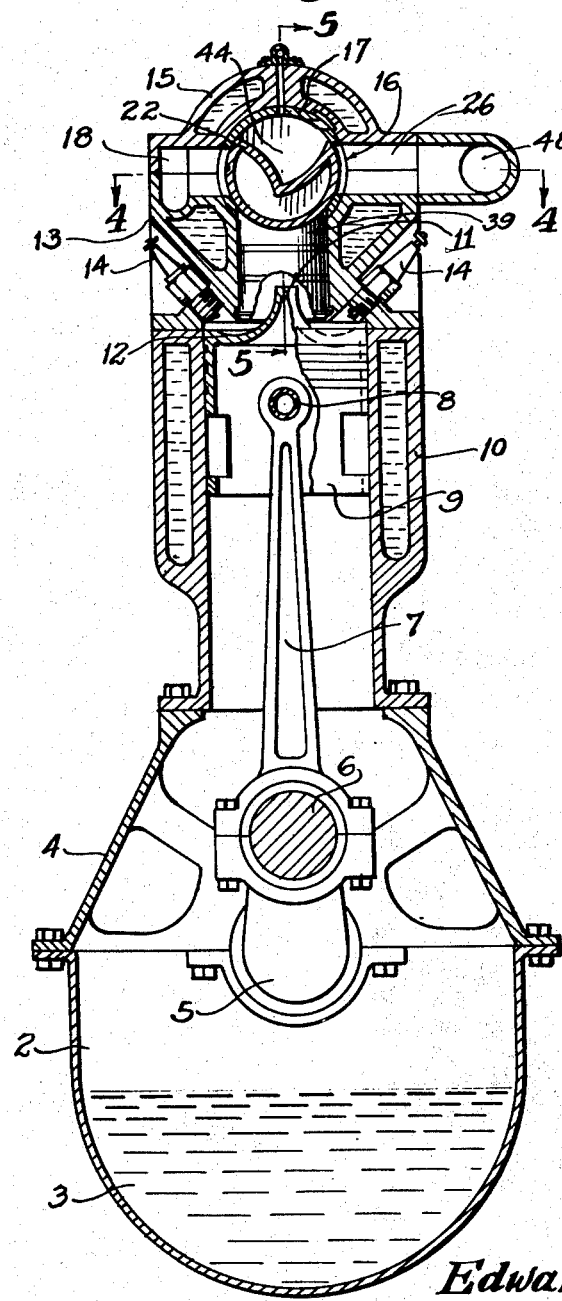

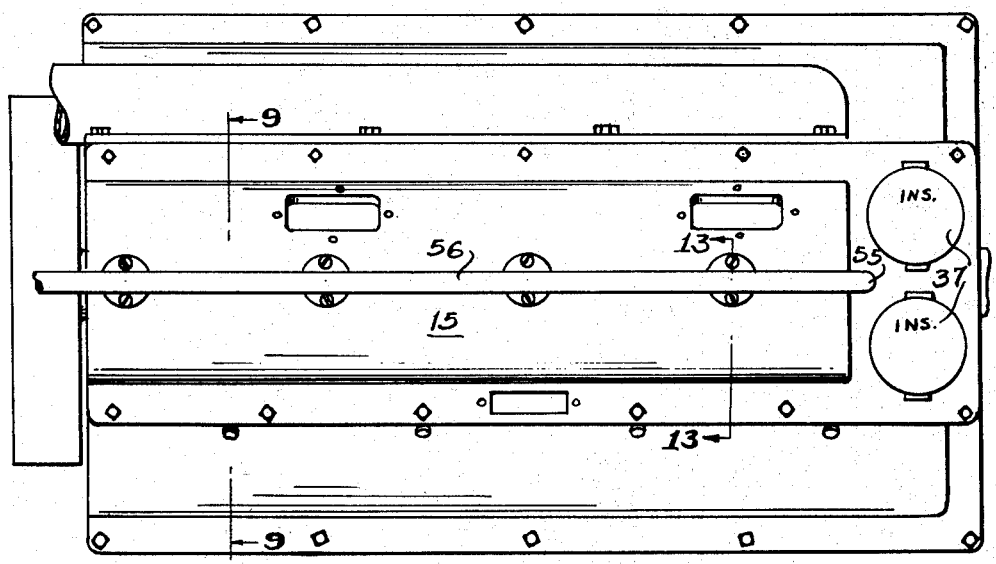
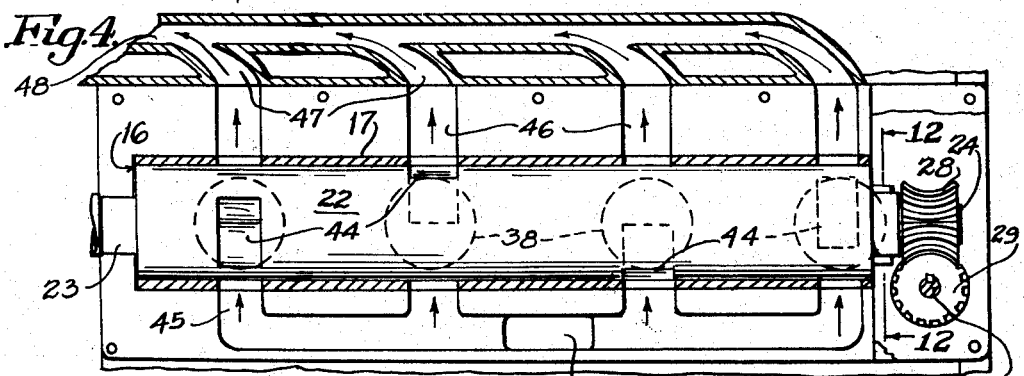
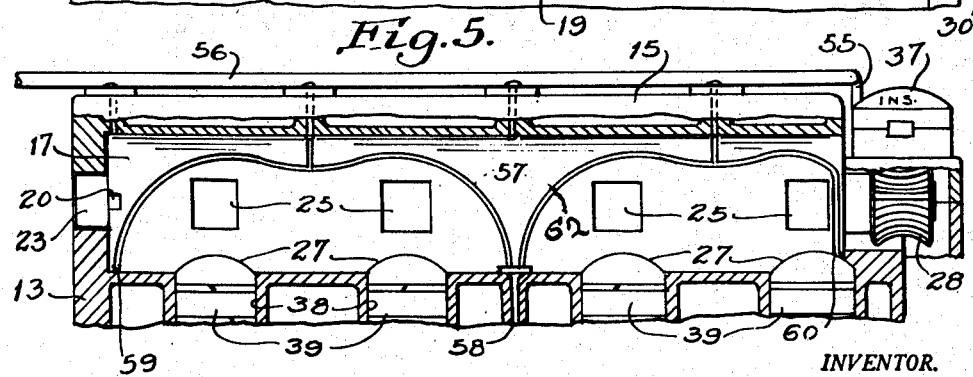

Patented Apr. 13, 1948

2,439,540

UNITED STATES PATENT OFFICE 2,439,540

ROTARY VALVE FOR INTERNAL-COMBUSTION ENGINES

Edward Graney Grubbs, Los Angeles, Calif.

Application May 2, 1944, Serial No. 533,766

1 Claim. (Cl. 123—80)

My invention relates to rotary valve for internal combustion engine of the four cycle type having special features of merit and high efficiency not heretofore arrived at by any engine known insofar as I am informed.

A special feature of my rotary valve is the mechanisms whereby I obtain a sealing of the rotary block with the intake and the exhaust of the engine.

Another feature of my rotary valve is the method which I use in lubricating it.

An object of my invention is to provide a rotary valve for an internal combustion engine having a valve block which revolves in a tube and which will be lubricated to the extent so that no appreciable wear takes place which will to any appreciable amount lessen the efficiency of the closure of the valve ports.

Another object of my invention is to provide a sealing block which will be held in contact with the revolving valve block which sealing mechanisms is held by the pressures developed inside the cylinders of the engine.

Another object of the invention is to provide, as it were, a duplicate system of pump pressures for forcing the lubricating oil which lubricates the revolving block, and my system insures absolute lubrication of said block at all times when there is any oil remaining in the crank case or the reservoir for oil lubrication.

Another object of the invention is to provide special shapes of the valve openings in the revolving block.

Other objects are obtained by the special arrangement of the mechanisms as shown and described in the drawings and the specification.

Reference will be had to the accompanying drawings in which:

Fig. 1 is a front end elevation of an internal combustion engine of which my valve mechanisms form a part. Parts are broken away in this view for clearness of illustration.

Fig. 2 is a transverse section through one of the cylinders in compression at the time when ignition takes place.

Fig. 3 is a top plan view of the engine.

Fig. 4 is a section on line 4—4 of Fig. 2.

Fig. 5 is a section on line 5—5 of Fig. 2.

Fig. 6 is a side elevation of a bronze sleeve in which the rotary valve block is mounted and is positioned at right angle to the position of rotation as is indicated by Fig. 7.

Fig. 7 is a side elevation of the valve block at a position of rotation at right angle to that of Fig. 6.

Fig. 8 are sections through the valve block as shown in Figs. 6 and 7, showing the relative position of the ports in the valve block indicating successive positions forming a complete cycle of revolutions of any given cylinder operation, indicated by lines 8—8 on Fig. 7.

Fig. 9 is a section through the cylinder head casting and valve block on line 9—9 of Fig. 3.

Fig. 10 is a plan and Fig. 11 is an elevation of a tubular sleeve which contacts the sides of the rotary valve block at the location of the ports.

Fig. 12 is a section on line 12—12 of Fig. 4 indicating an oil pump mounting.

Fig. 13 is a section of a part of the cylinder casting on line 13—13 of Fig. 3.

Fig. 14 is a plan of clamping ring mounted underneath the tubular sleeve.

Fig. 15 is an edge view of the said clamping ring.

The engine is provided with any suitable crank case 2 in which there is the common oil sump 3. Above the case 2 there is the base casting 4 of common construction. To the casting 4 there is mounted in suitable bearings the crank shaft 5 having crank bearings 6 on which are mounted the crank rods 7 which are connected by piston pins 8 to pistons 9 which are mounted into the cylinder block casting 10.

The pistons 9 are of the usual form save only that their tops are provided with a central projection 11 extending upwardly from a circular depression 12 surrounding the central upward projections 11, see Fig. 2.

On the top of the cylinder block casting 10 there is mounted a cylinder head casting 13. Duplicate spark plugs 14 are mounted on the sides of each cylinder. These plugs 14 are aligned in direction toward the circular depression 12 forming a double ignition system of common use.

On the top of the cylinder head casting 13 there is mounted in any suitable manner the top casting 15, and is here shown as being bolted to the cylinder head casting 13. These castings 13 and 15 form the casing for the rotary valve mechanisms and are hereinafter mentioned as the valve casing.

Extending lengthwise in the valve casing there is a cylindrical bore 16 in which there is mounted a bronze sleeve 17 in which there are apertures on each side forming entrance and exit ports for the intake and exhaust to and from the cylinders of the engine.

On the left side of Fig. 2 in the valve casing there is the entrance port chamber 18 which is open to any suitable supply of gas or vapor charged air by an opening 19, as shown in Fig. 4.

On the right side of the valve casing, see Fig. 2, there are the exhaust ports 26.

The gas supply or carburating means, not being a part of this invention, are not necessarily shown or described in the drawings.

The bronze sleeve 17 is held in fixed relation by any suitable means, preventing its revolving in the cylindrical bore 16. This is shown accomplished as desired by a notch 20 in the end of the sleeve 17, see Fig. 6, into which there extends a projection 21 shown only in dotted lines in Fig. 6.

A rotary valve block 22 is provided with trunnions 23 on the left and trunnions 24 on the right, see Figs. 6 and 7.

The bronze sleeve 17 being in fixed position in the valve casing is provided with open ports 25 on its opposite sides and with open ports 27 on the lower side, see Fig. 6.

A rotary valve block 22 is made of any suitable material but of preferably high quality cast iron and is sized and polished to fit neatly for revolving inside the bronze sleeve 17 in which it is mounted.

On the right end of the rotary valve block 22 on a trunnion 24 there is mounted a worm gear 28 which is engaged by a vertical worm gear 29 on a vertical shaft 30, see Fig. 1. The vertical shaft 30 extends down into a sleeve 31 which sleeve 31 extends down outside of the cylinder block casting 10 and enters into the crank case 2, see Fig. 1.

The shaft 30 is jointed at 32 in any suitable manner of fixed relationship with a shaft 33 which extends down through the sleeve 31 and on the lower end of which there is mounted a worm gear 34 which is engaged by a worm 35 on the crank shaft 5 whereby the aforementioned gears revolve the block 22.

This gearing is so timed in relation to the strokes of the pistons of the engine as to provide valve openings and closings for a regular four cycle engine.

On the upper end of the vertical shaft 30 which extends outside the valve casing there is mounted the electrical distributors 36 of the electric currents going to the ignition spark 14. These distributors 36 are covered by caps 37 as desired. The distributor at the right side of Fig. 1 is actuated by a gear 61 which meshes with the gear 28 in like manner as does gear 29.

In the valve casing there are cylindrical openings 38 of smaller diameter than the cylinders of the engine and are located concentrically and above each cylinder of the engine. Into these openings there are mounted tubular sleeves 39 fitting closely into the openings 38, see Figs. 9, 10, and 11. These sleeves 39 are adapted to slide up and down like a piston might do and are provided with rings like a piston for the prevention of leakage on their sides.

The top ends of the sleeves 39 are shaped to fit snugly and tightly to the curved surfaces of the valve block 22. The lower ends of the sleeves 39 are provided with flanges 40. The openings 38 are enlarged at 41 to accommodate the flanges 40 of the sleeves 39.

In the valve casing below the bottom of the opening 38 there is an inclined surface 42 into which there is sprung a split clamping ring 43.

After the tubular sleeves 39 are inserted into the openings 38 the split clamping ring 43 is snapped into place which prevents the sleeves 39 from coming out.

The end area of the sleeve, as supported by the clamping ring 43 and the ring itself, is open to the pressure that develops in the cylinders and this acts to press the sleeves 39 upwardly into tight contact with the rotary valve block 22 around the ports 44 of the valve block 22 itself.

The ports in the valve block 22 are indicated as 44 and are all alike as far as their actual shapes are concerned, but are located at different angularities along the valve block 22.

One position of complete closure for the work stroke is indicated in Fig. 2.

By referring to Fig. 4 the positions of the intake ports are indicated by 45 and the position of the exhaust ports are indicated by 46.

The final discharge from the exhaust ports 46 passes through the curved channels 47 and out through to any exhaust exit through the opening 48.

A lubricating oil pump of rotary type is indicated by 49, see Fig. 1, wherein the oil is taken from the sump 3 of the crank case 2 and is forced through the pipe 50 which is connected to the pipe 51 which extends upwardly and outwardly and is connected, as shown by the dotted lines 52, to an intake opening 53, see Fig. 1, into the valve casing entering to the bore, see Fig. 12.

The opening 53 is at the right end of Figs. 3, 4, 5 and 6 and 7, and in this opening 53 there is a check valve 54 which allows oil to flow into the bore 16 but does not allow oil to escape backwards from the bore.

A secondary or assistant oil pump is provided at the right end of Figs. 6, 7, 3, 4 and 5, which is as it were, a suction pump of rotary type which draws oil upward through the opening 53 and discharges it upwardly through a vertical pipe 55 which is turned over into a horizontal pipe 56 which distributes the oil through vertical downward ducts at 57 into the horizontal and curved ducts 62 in the side of the bronze sleeve 17.

This duct 62 is a slot cut entirely through the side of the sleeve 17 and distributes the oil along the whole length of the valve block 22.

The excess oil is circulated downward into the crank case 2 through the exit ports 58, 59 and 60, see Fig. 5, to any suitable piping entering to the oil sump 3 of the crank case 2.

The horizontal pipe 56 at its left end, as is indicated by Fig. 5, may be closed off or it too may have a pipe extending to the oil sump 3 to the crank case 2 as desired.

What I claim is:

In a rotary valve gas engine having compression cylinders, pistons in said cylinders, means for sealing said valve against leakage due to compression of said pistons moving in said cylinders, comprising a cylindrical member engaging said rotary valve and mounted for axial movement relative thereto and held in sealing engagement therewith through compression generated by movement of said pistons, said cylindrical sealing member having an external flange on its end away from said rotary valve, an extension of said compression cylinders, a three dimension bore in said extension including a ledge at its lower end, for the reception of said cylindrical sealing member, a compressible retaining ring adapted to snap into the lower end of said extension and having a bevel surface on its lower edge to rest on said ledge to hold said cylindrical sealing member in said cylindrical extension when said parts are assembled in operative relation to seal said valve, which construction and assemblage of parts permits disassembling thereof by simply pressing downward on said cylindrical sealing member which will force and compress said compressible retaining ring past said ledge and thereby permit removal of said sealing member from the lower end of said extension.

EDWARD GRANEY GRUBBS.

REFERENCES CITED

The following references are of record in the file of this patent:

UNITED STATES PATENTS

| Number | Name | Date |
|---|---|---|
| 256,781 | Winkler | Apr. 18, 1882 |
| 1,178,586 | La Pointe | Apr. 11, 1916 |
| 1,198,654 | Palmer | Sept. 19, 1916 |
| 1,222,376 | Van Keuren | May 8, 1917 |
| 1,304,039 | Goldbeck | May 20, 1919 |
| 1,392,819 | Davis | Oct. 4, 1921 |
| 1,417,590 | Warren | May 30, 1922 |
| 1,529,593 | Hutchins | Mar. 10, 1925 |
| 1,554,475 | Wendell et al. | Sept. 22, 1925 |
| 1,650,362 | Jewell | Nov. 22, 1927 |
| 1,707,737 | Litton | Apr. 2, 1929 |